(12) United States Patent
McEntee

(10) Patent No.: US 7,004,483 B1
(45) Date of Patent: Feb. 28, 2006

(54) CART FOR LARGE SLABS

(75) Inventor: Stephen McEntee, Glen Mills, PA (US)

(73) Assignee: Marble Crafters, Inc., Trainer, PA (US)

( * ) Notice: Subject to any disclaimer, the term of this patent is extended or adjusted under 35 U.S.C. 154(b) by 164 days.

(21) Appl. No.: 10/184,189

(22) Filed: Jun. 27, 2002
(Under 37 CFR 1.47)

Related U.S. Application Data

(60) Provisional application No. 60/301,610, filed on Jun. 28, 2001.

(51) Int. Cl.
B62B 3/04 (2006.01)

(52) U.S. Cl. ............... 280/47.35; 280/43.23; 280/79.3

(58) Field of Classification Search ............ 280/43.23, 280/47.35, 79.3, 79.7; 414/11, 446, 449
See application file for complete search history.

(56) References Cited

U.S. PATENT DOCUMENTS

| | | | | |
|---|---|---|---|---|
| 643,324 A * | 2/1900 | Dycus et al. | ............ | 280/47.16 |
| 1,538,054 A * | 5/1925 | Ohnstrand | ............... | 280/47.11 |
| 1,740,000 A * | 12/1929 | Andrews et al. | ............. | 220/1.5 |
| 1,832,770 A * | 11/1931 | Hallowell | ....................... | 16/29 |
| 1,930,078 A * | 10/1933 | Bentley et al. | .......... | 280/47.16 |
| 2,201,533 A * | 5/1940 | Goldman | ................. | 280/47.35 |
| 2,492,002 A * | 12/1949 | Paddock | ..................... | 280/79.3 |
| 3,265,404 A * | 8/1966 | Skufca | ....................... | 280/79.3 |
| 3,297,276 A * | 1/1967 | Skufca | ....................... | 242/131 |
| 3,580,601 A * | 5/1971 | Miles | ..................... | 280/47.131 |
| 3,841,651 A * | 10/1974 | Bigney | ..................... | 280/47.16 |
| 4,488,733 A * | 12/1984 | Hellsten | ................. | 280/47.16 |
| 4,793,624 A * | 12/1988 | Mace | ....................... | 280/47.16 |
| 5,120,072 A * | 6/1992 | Laramie | ................. | 280/47.17 |
| 5,226,656 A * | 7/1993 | Mayer | ....................... | 280/79.2 |
| 5,397,209 A * | 3/1995 | Heim | ....................... | 414/349 |
| 5,556,118 A * | 9/1996 | Kern et al. | ............. | 280/47.16 |
| 5,762,348 A * | 6/1998 | Echternacht | ............. | 280/79.7 |
| 5,845,914 A * | 12/1998 | Lenkman | ................. | 280/43.17 |
| 5,899,650 A * | 5/1999 | Collins | ....................... | 414/10 |
| 6,019,565 A * | 2/2000 | Gesuale | ..................... | 414/458 |
| 6,450,514 B1 * | 9/2002 | Ronca | ..................... | 280/79.11 |

\* cited by examiner

Primary Examiner—James W. Keenan
(74) Attorney, Agent, or Firm—Eugene E. Renz, Jr.

(57) ABSTRACT

The Invention is a cart for moving slabs of stone, such as marble and granite. In a first embodiment, main wheel support the weight of the slabs while front and rear end wheel prevent tipping of the cart. A hydraulic system withdraws the wheels, rendering the cart stationary. In a second embodiment, a main wheel carriage is clamped directly to a slab and bears its weight while smaller front and rear end wheel carriages clamped to the slab prevent tipping of the slab. The wheel arrangement of both embodiments allows the heavy slabs of stone to be readily maneuvered and rotated.

4 Claims, 13 Drawing Sheets

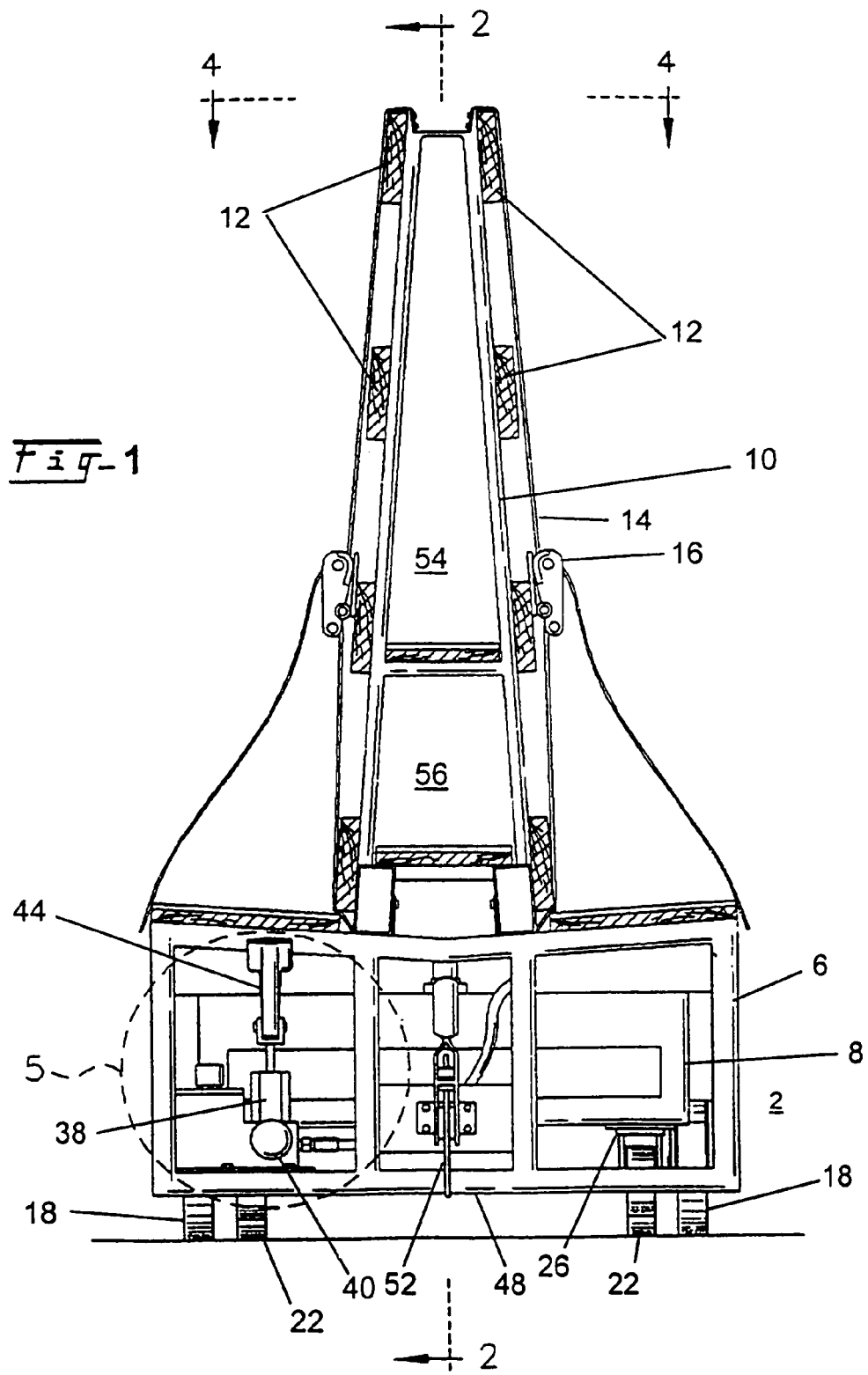

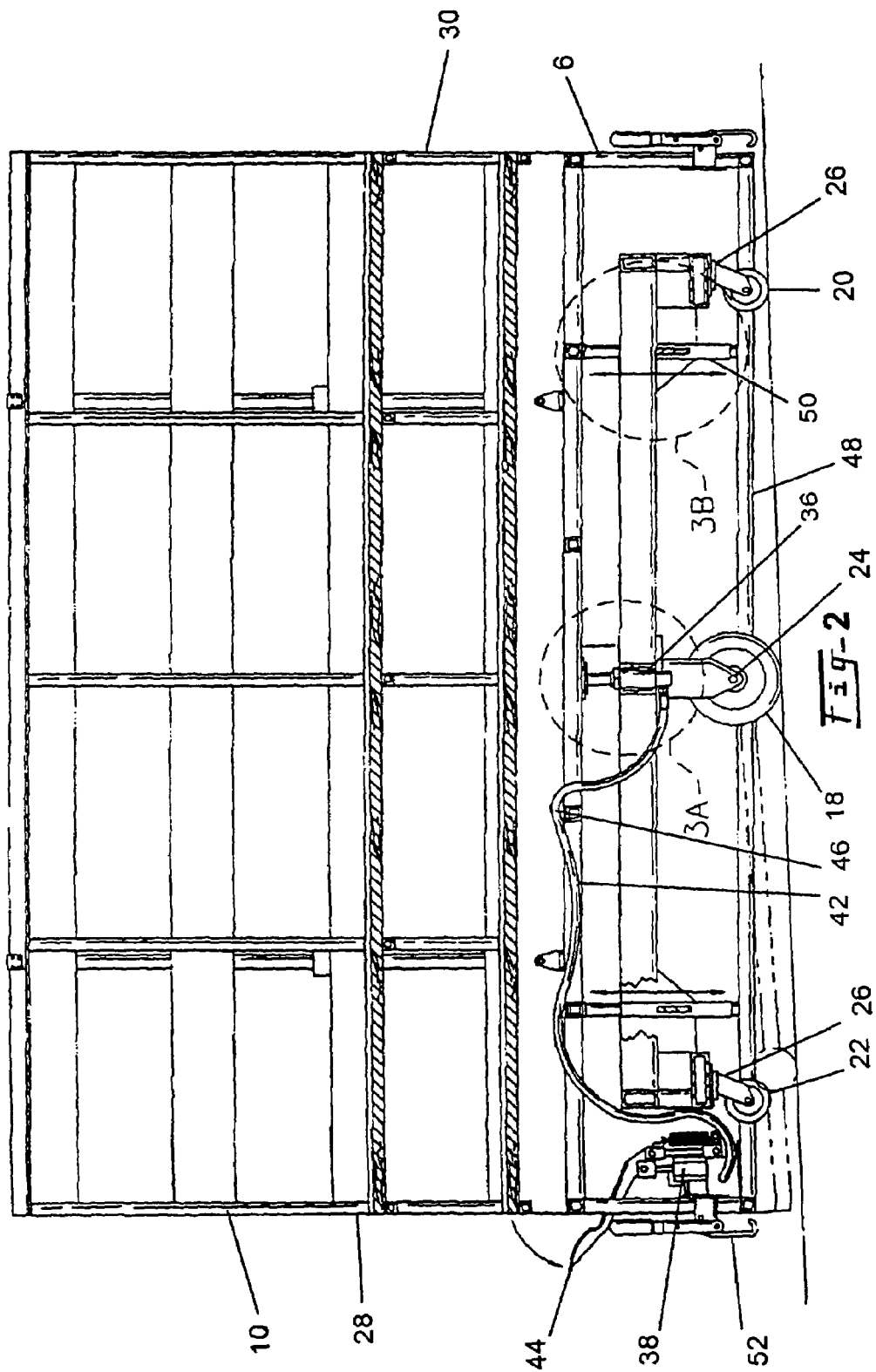

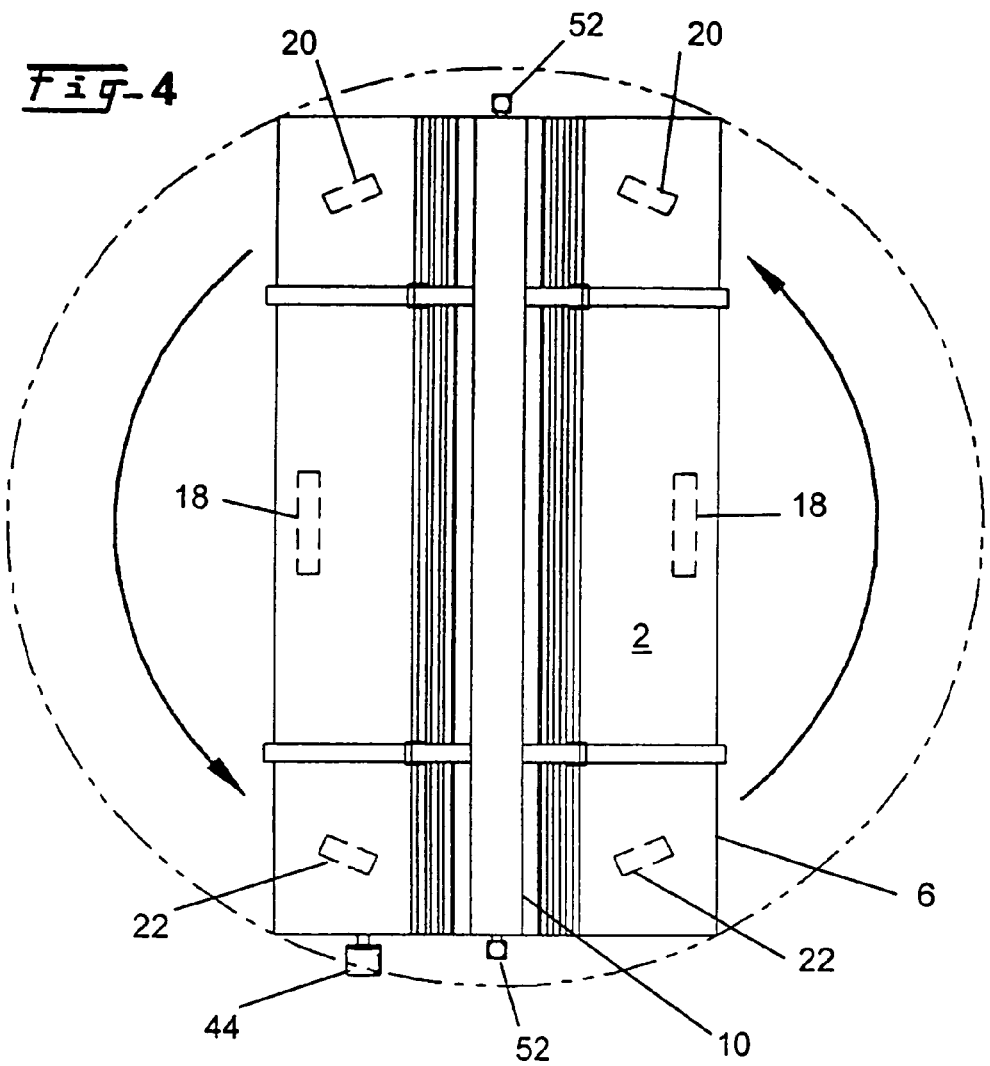
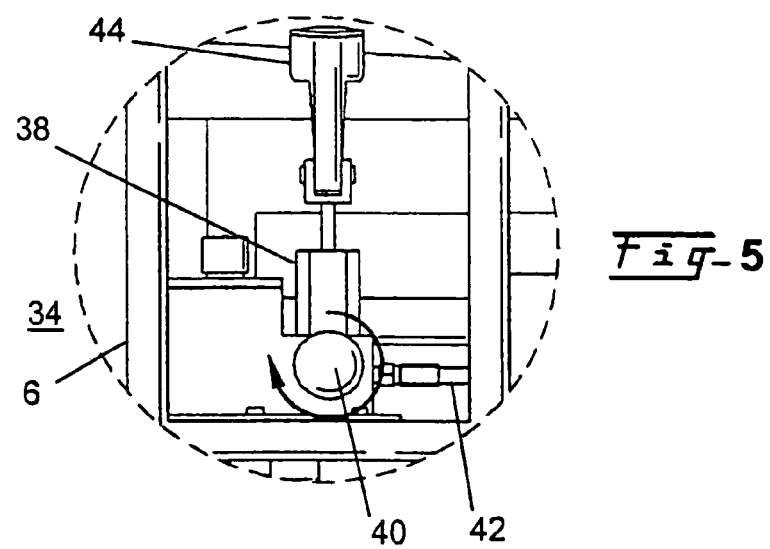

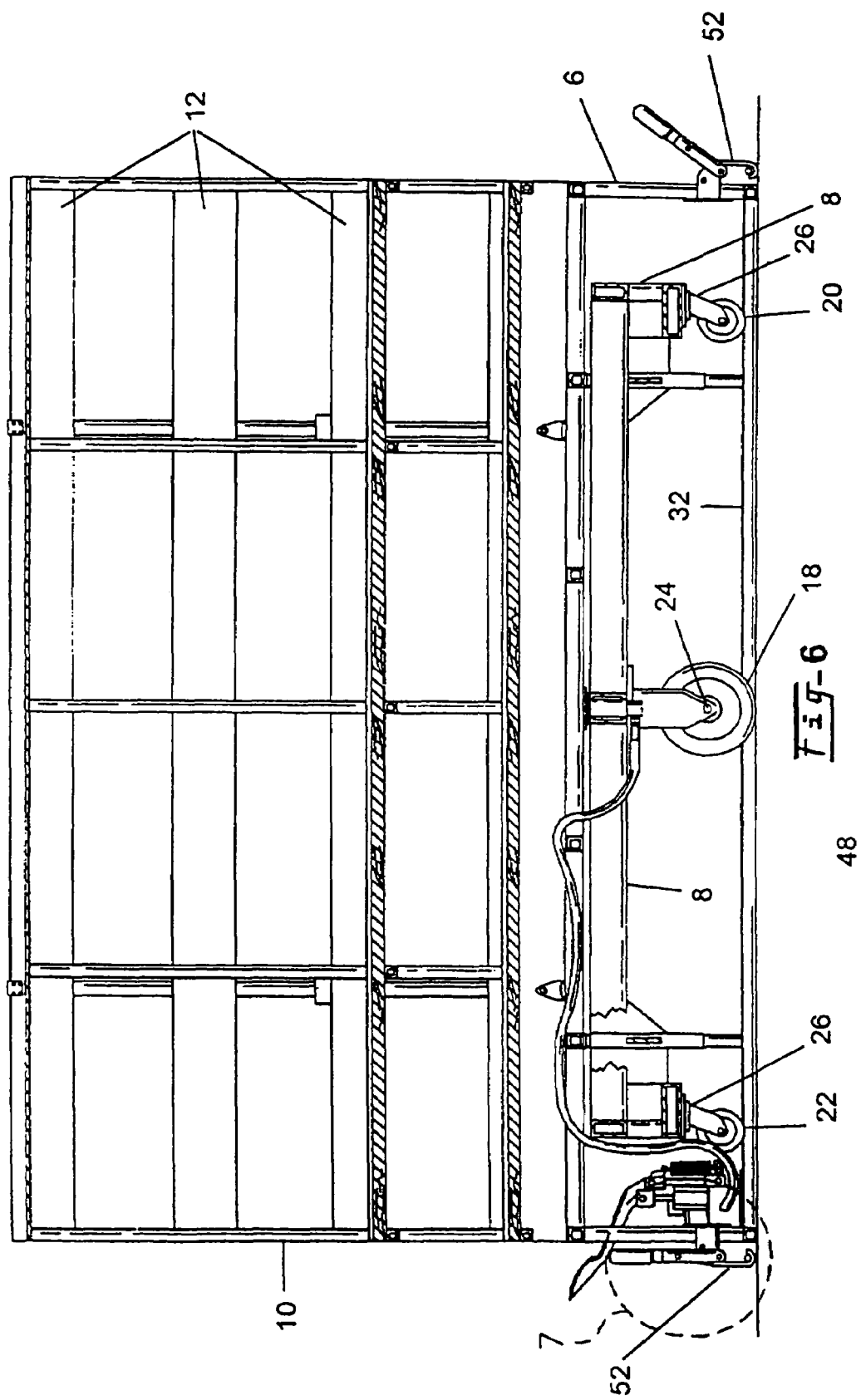

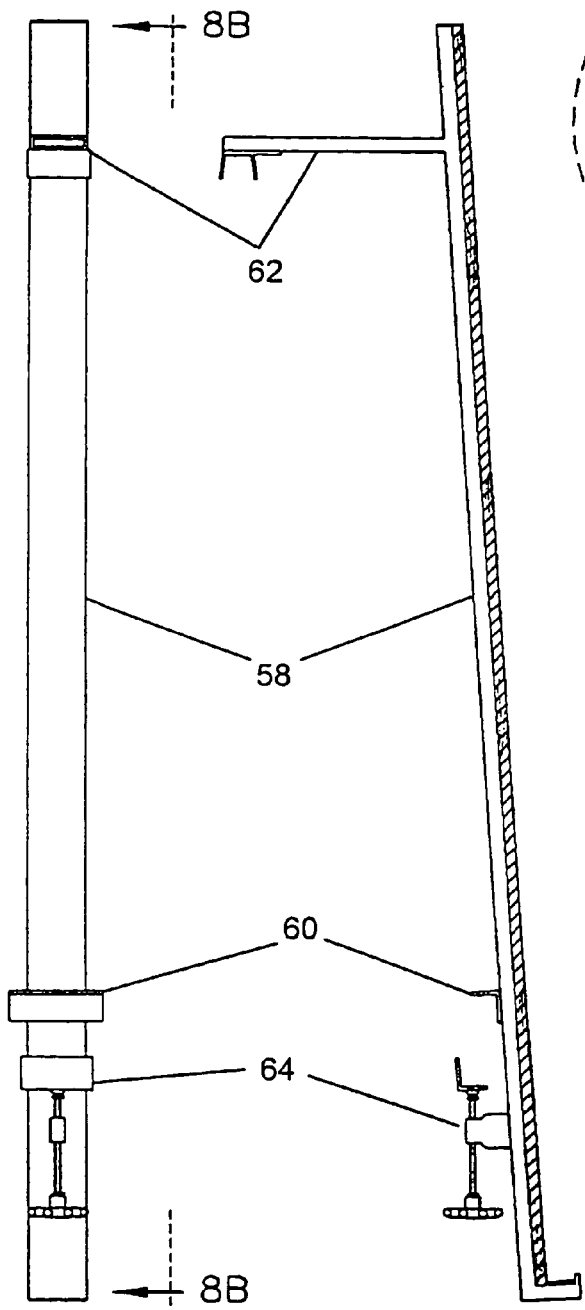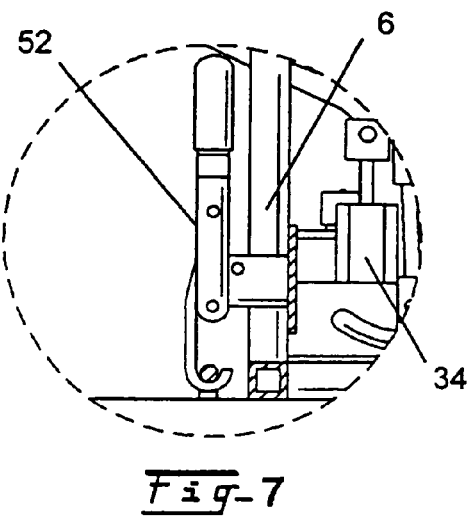

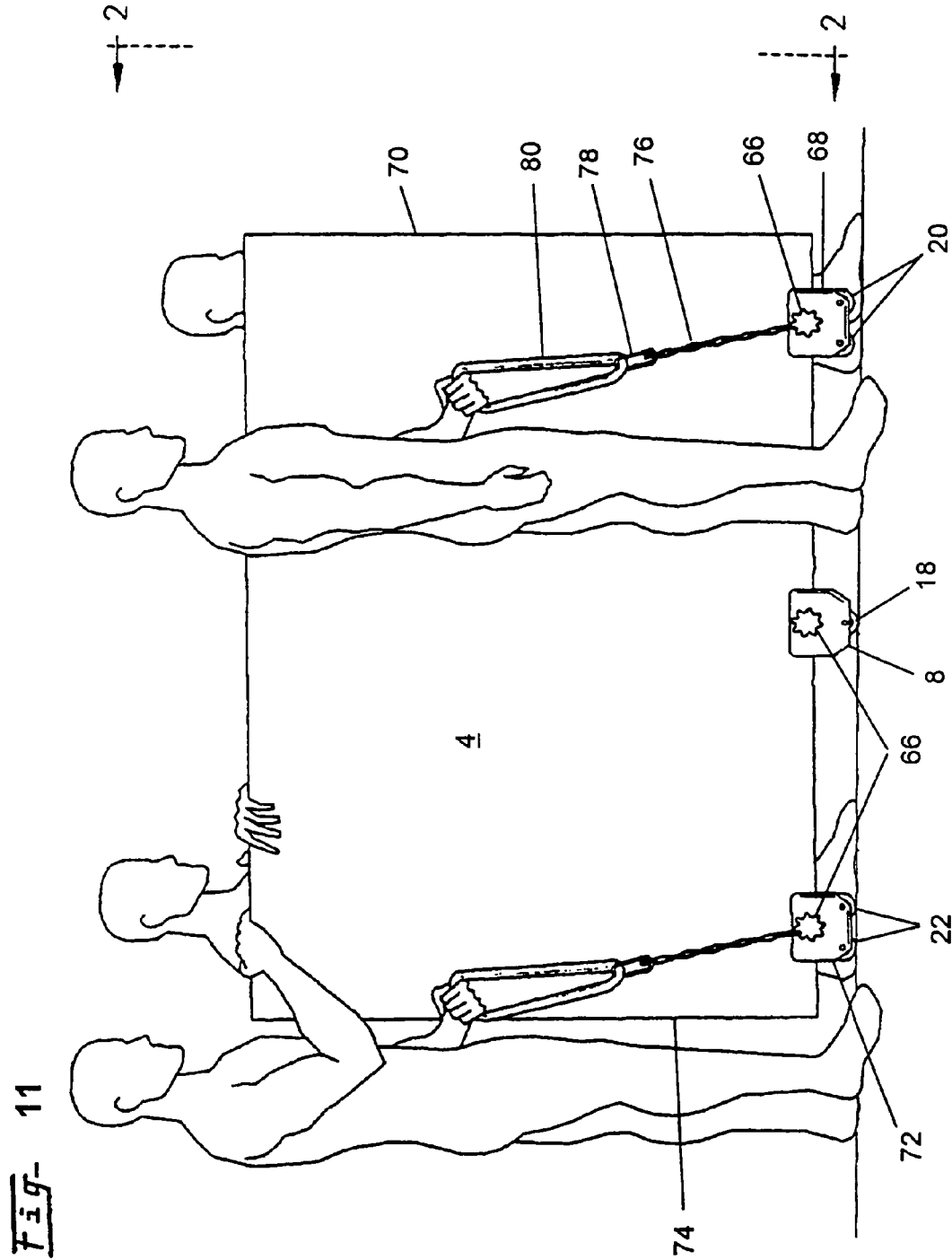

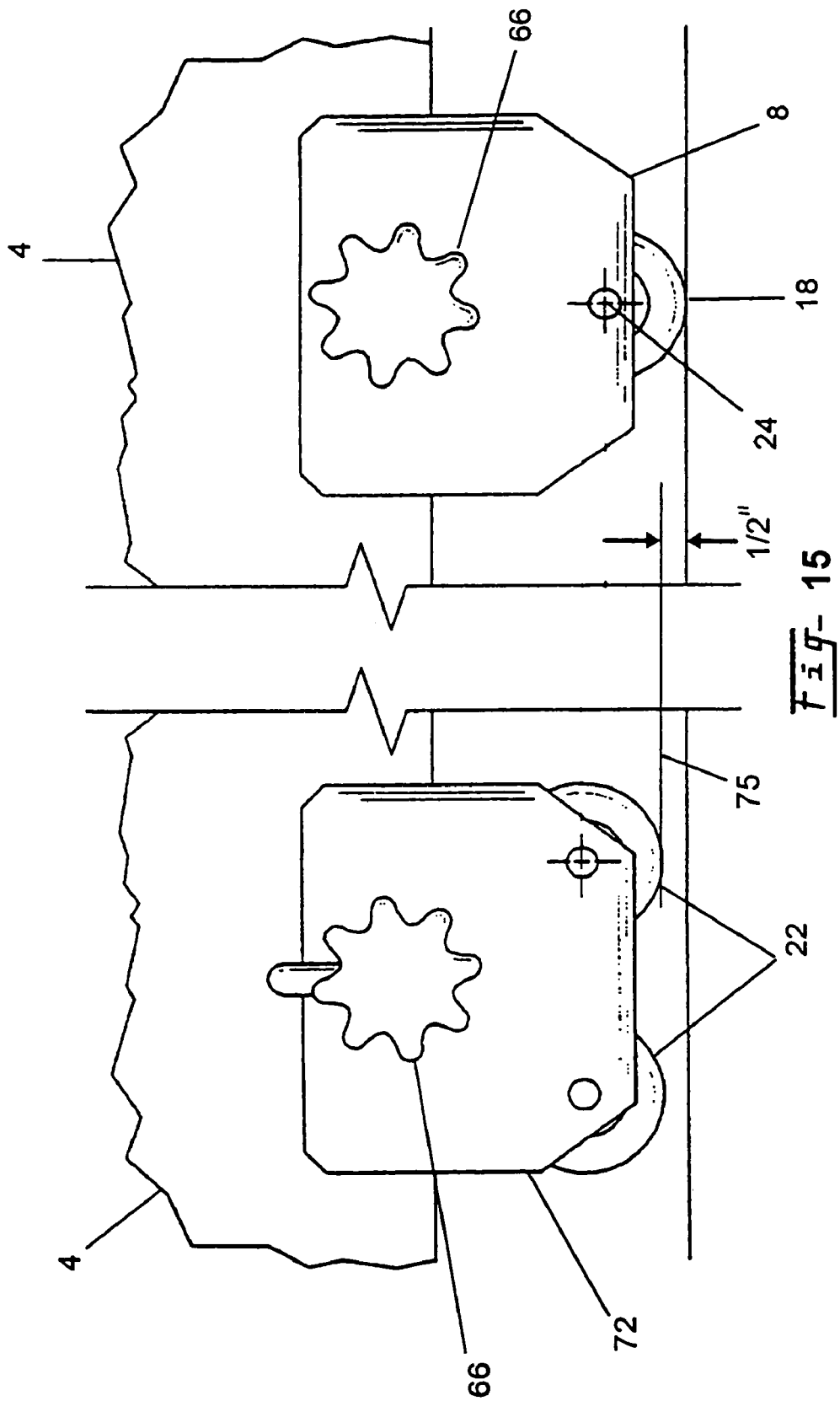

CART FOR LARGE SLABS

This application claims the benefit of Provisional Application Ser. No. 60/301,610 filed Jun. 28, 2001.

FIELD OF THE INVENTION

The invention relates to a cart for moving slabs, such as slabs of marble or granite within a plant for processing marble and granite. The invention also relates to a cart for moving slabs of marble or granite to and within the premises of a customer.

DESCRIPTION OF THE RELATED ART

Stone slabs are highly desirable for architectural uses such as countertops, floors and panels due to the appearance, texture and durability of the stone. In this application, the term 'slab' means any generally rectangular three dimensional solid where two dimensions are large relative to the third dimension. Granite and marble are commonly used species of stone for architectural features.

Stone slabs usually are received by a stone processing facility in a rough state. The stone is smoothed, polished and cut into finished products in a multi-step process that may involve moving slabs from one work station to another. Stone slabs are characterized by their great weight. The relatively large weight of stone and the large sizes of the slabs render movement of the slabs difficult and inconvenient.

Movement of materials has been discussed in the prior art. U.S. Pat. No. 4,793,624 to Mace issued Dec. 27, 1988 discloses a cart for moving planar materials such as plywood or drywall. The Mace patent does not address moving large slabs of stone. The Mace cart includes two main wheels disposed laterally about the center line of the cart in the general direction of travel of the cart, combined with two castors disposed longitudinally to the general direction of travel of the cart. The Mace cart does not include the movable carriage of the first embodiment of the Invention and does not include the use of separate main carriage, front carriage and rear carriage of the second embodiment of the Invention.

U.S. Pat. No. 5,762,348 to Echternacht issued Jun. 9, 1998 teaches a cart for moving construction panels. The Echternacht cart includes a lift for holding the construction panel in position for installation at a construction site. The cart does not include the wheel arrangement of the Invention and does not include the movable carriage of first embodiment of the Invention or the separate main carriage, front carriage and rear carriage of the second embodiment of the Invention.

U.S. Pat. No. 6,019,565 to Gesuale issued Feb. 12, 2000 teaches a cart with a hydraulic lifting device to transport and lift a container of bulk materials. The Gesuale cart does not include the wheel arrangement of the Invention and does not include the movable carriage of the first embodiment of the Invention or the separate main carriage, front carriage and rear carriage of the second embodiment of the Invention.

U.S. Pat. No. 5,845,914 to Lenkman issued Dec. 8, 1998 revealed a cart for transporting electronic equipment. The cart included a movable frame allowing the cart to be lifted from a resting position and to be moved about on wheels; however, the Lenkman cart did not include the wheel arrangement of the Invention and did not include the separate main carriage, front carriage and rear carriage of the second embodiment of the Invention.

The prior art neither teaches nor suggests the arrangement of wheels of the Invention for the moving of large slabs of stone. The prior art neither teaches nor suggests the combination in the first embodiment of the Invention of a movable carriage and the arrangement of wheels. The prior art neither teaches nor suggests the use of a separate main carriage, front carriage and rear carriage of the second embodiment of the Invention.

SUMMARY OF THE INVENTION

The first embodiment of the Invention is a cart having a base for supporting a load of stone slabs. A carriage having a first and a second position is movably affixed to the base. In the first position of the carriage, the weight of the cart and load is supported by wheels attached to the carriage, allowing the cart to be moved on the wheels. In the second position, the carriage is hydraulically moved so that the base rests directly on the floor and the weight of the cart and the load is supported by the base, rendering the cart stationary.

The main wheels of the first embodiment are attached to the carriage such that main wheels support the weight of the cart and load when the carriage is in the first position. A front end wheel and a rear end wheel each is mounted on the carriage. The main wheels extend downward beyond the front end and rear end wheels so that the front and rear end wheels cannot touch a flat floor at the same time. The weight of the cart and load is supported by the main wheels, while the front end and rear end wheels prevents the cart from tipping in either the front or rear direction, respectively. The wheel arrangement allows the loaded cart to be readily maneuvered and rotated within its length. The hydraulic system allows the cart to be fixed in a stationary position.

In the second embodiment, front end wheels and rear end wheels are mounted on separate end wheel carriages that are clamped directly to a single vertically disposed slab of stone. A main wheel is mounted to a separate carriage that also is clamped directly to the slab of stone between the front and rear end wheels such that the main wheel is substantially under the center of mass of the slab. The main wheel extends downward beyond the front and rear end wheels and bears substantially the weight of the slab. The front end wheels and rear end wheels prevent the slab from tipping to the front and rear. The slab is prevented from tipping laterally be a crew of operators. Straps connected to the front end and rear end wheel carriages allow the crew of operators to maneuver the slab and to rotate the slab in its length.

BRIEF DESCRIPTION OF THE DRAWINGS

These and other objects of the Invention and various features and details of the operation and construction thereof are hereinafter more fully set forth with reference to the accompanying drawings, wherein:

FIG. 1 is an end elevation of a cart for transporting large slabs of marble or granite incorporating the Invention.

FIG. 2 is a side sectional view of the cart shown in FIG. 1.

FIG. 4 is a top view of the cart of FIG. 1.

FIG. 5 is a detail the lever, hydraulic pump and valve

FIG. 6 is a side elevation of the cart of FIG. 1.

FIG. 7 is a detail of the locking hook.

FIG. 8A is a side elevation of a supplemental frame.

FIG. 8B is an end elevation of a supplemental frame.

FIG. 11 is a side elevation of the second embodiment.

FIG. 15 is a carriage detail for the second embodiment.

DESCRIPTION OF PREFERRED EMBODIMENTS

Figure 3A:
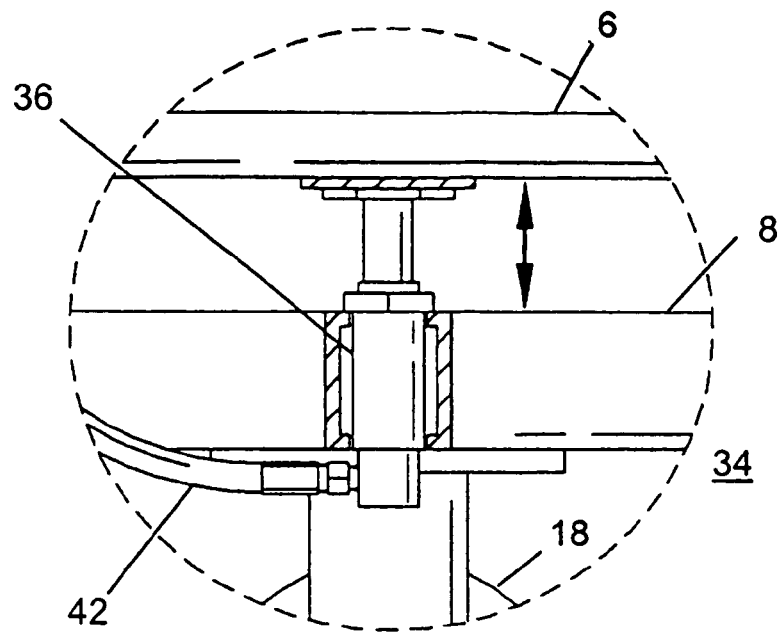
FIG. 3A is a detail of the hydraulic cylinder.
Figure 3B:
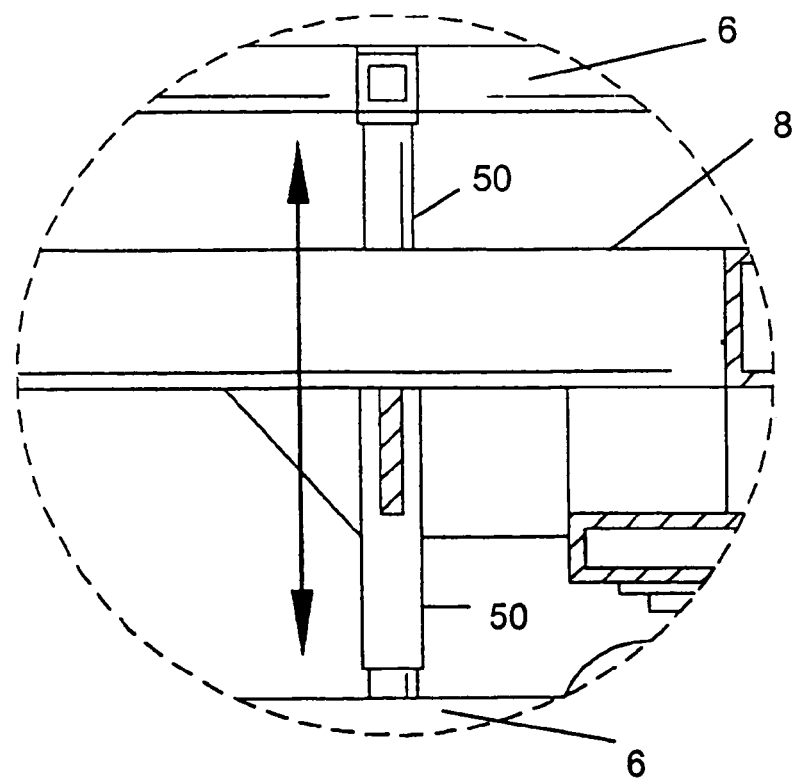
FIG. 3B is a detail of the pin and sleeve members.
Figure 9:
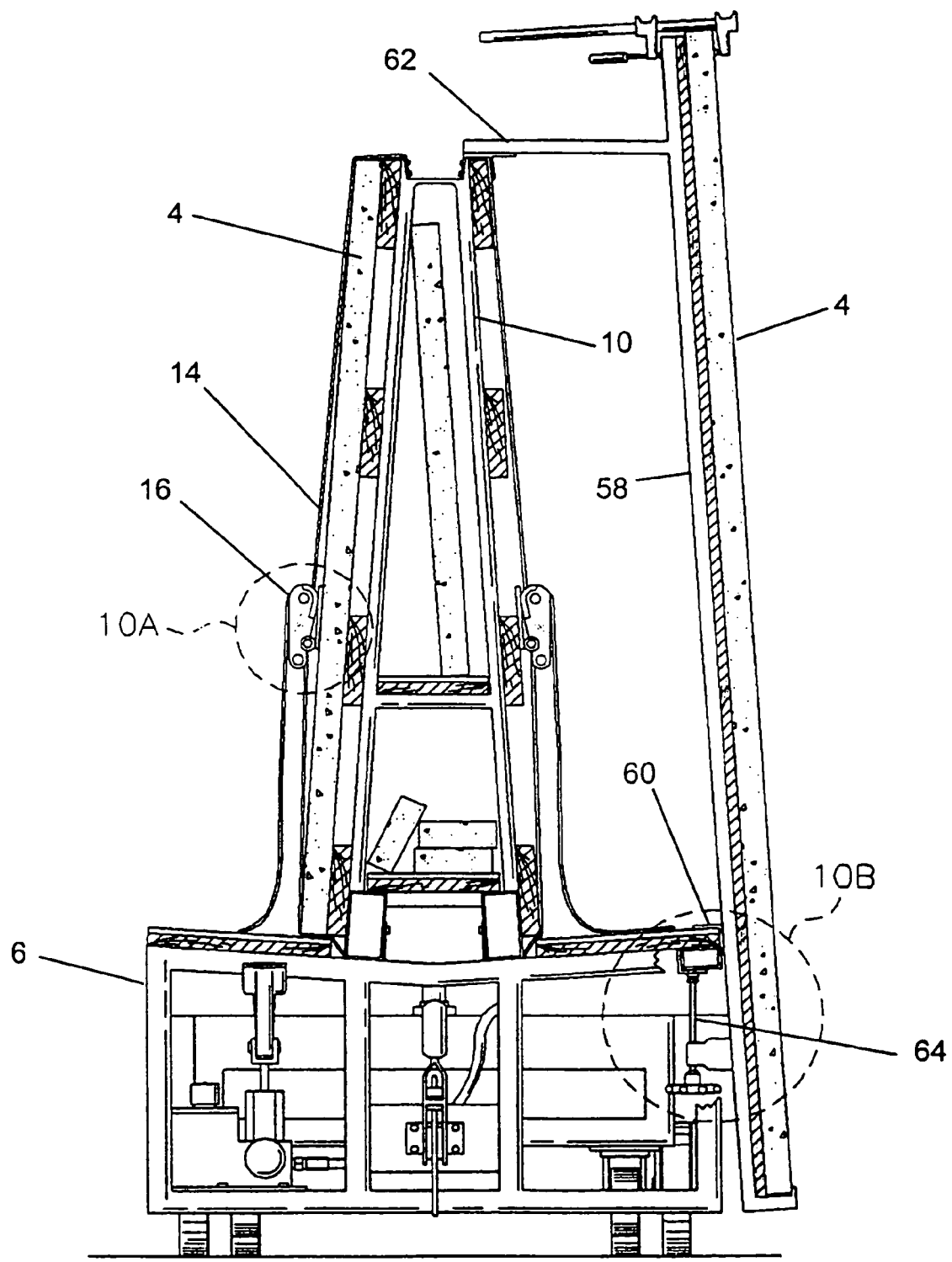
FIG. 9 is an end elevation of the cart of FIG. 1 with the supplemental frame in place.
Figure 10A:
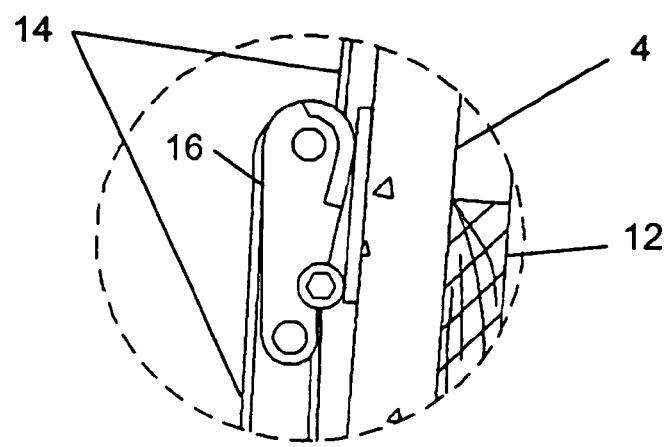
FIG. 10A is a detail of a strap and buckle.
Figure 10B:
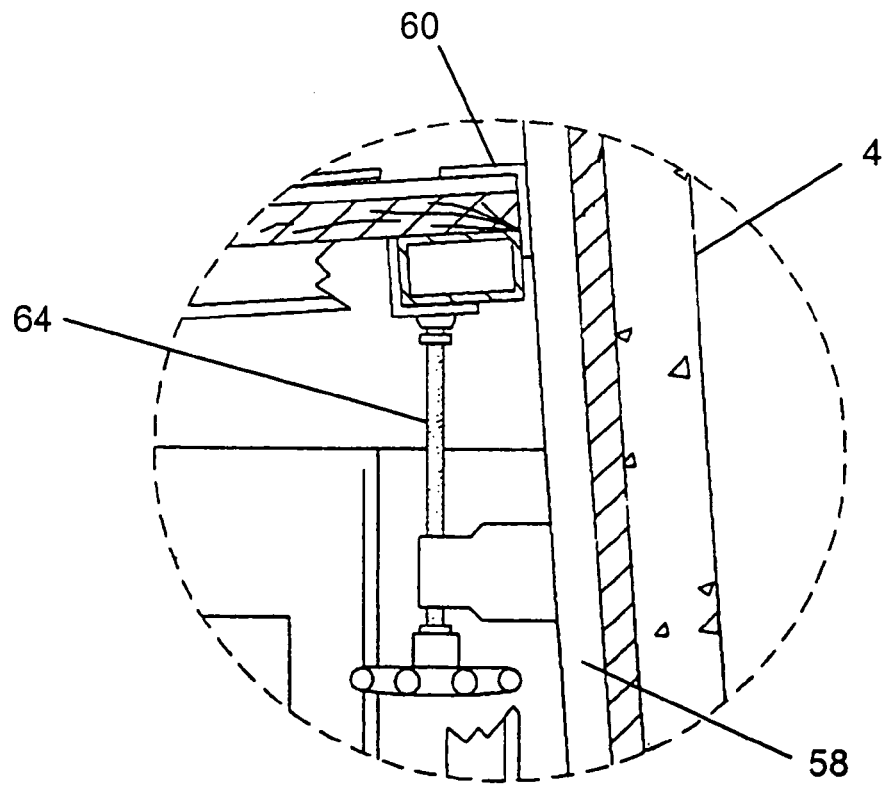
FIG. 10B is a detail of the supplemental frame in place on the cart.
Figure 12:
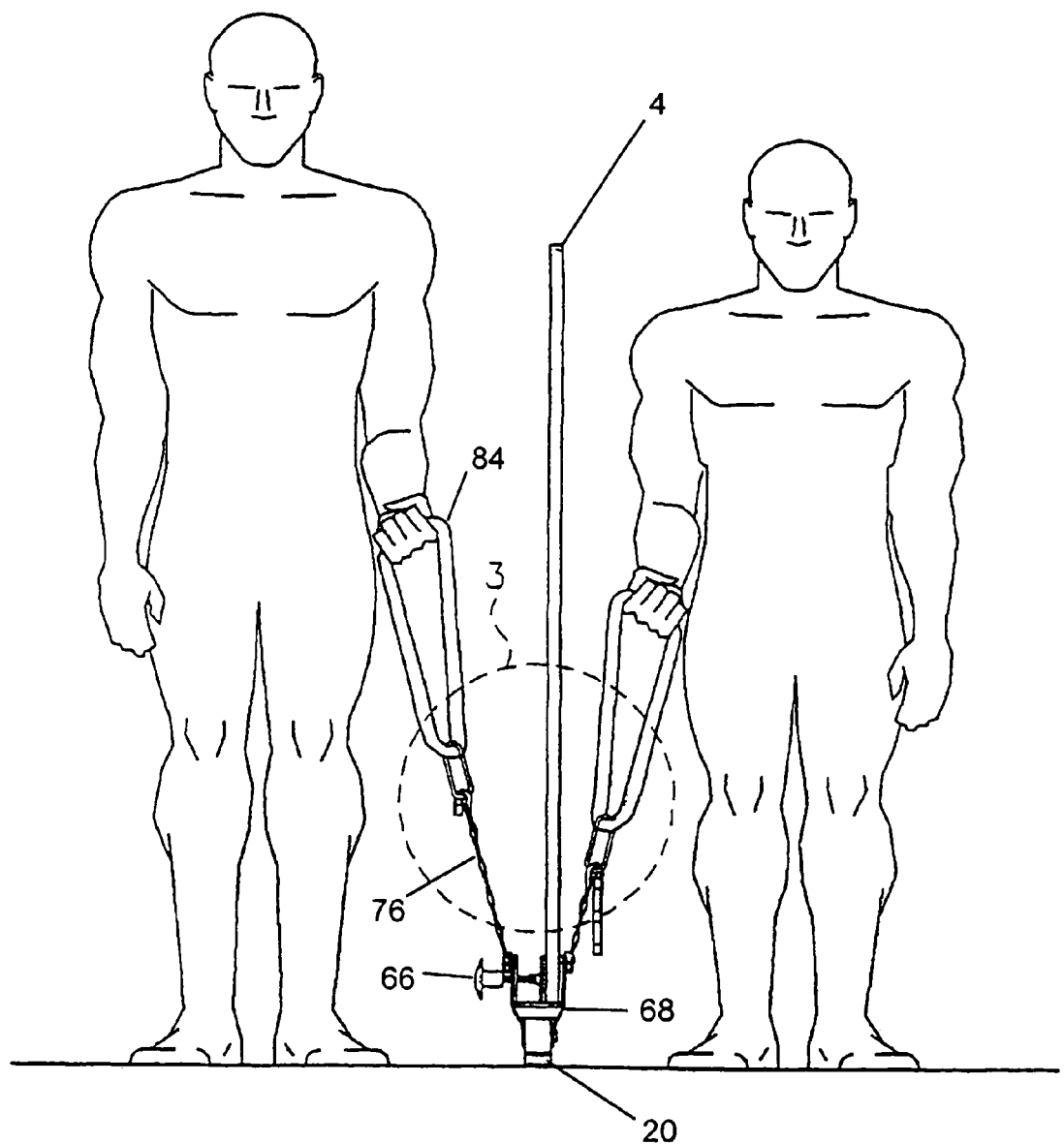
FIG. 12 is an end elevation of a second embodiment.
Figure 13:
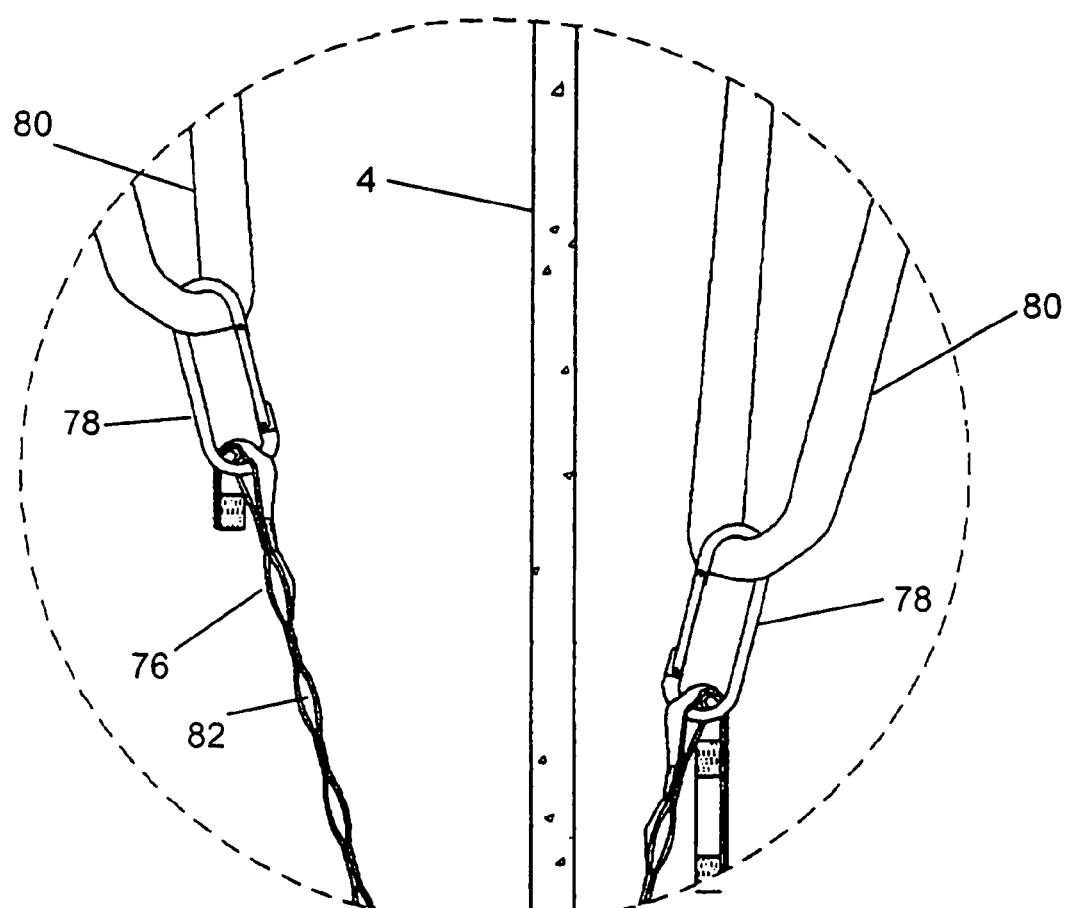
FIG. 13 is a detail of the strap adjustment for the second embodiment.

The Invention relates to a cart 2 for use in a plant for finishing granite and marble products to move the large stone slabs 4 from one location to another. The cart 2 also is suitable for use in transporting a finished stone product to a customer and for moving the finished product within the premises of the customer in preparation for installation.

The first embodiment is shown by FIGS. 1 through 10B. The cart 2 includes a base 6, a wheeled carriage 8 that nests within the base 6 and an upstanding 'A' frame 10 extending upward from the base 6. The 'A' from 10 is an open structure and has longitudinally extending spaced boards 12 against which the slabs 4 (FIG. 9) of granite or marble are supported by means of the strap 14 and the buckle 16 arrangement. The carriage 8 has a first, or deployed, position with respect to the base (FIGS. 1, 2) and a second, or retracted, position with respect to the base (FIG. 6). In the first position of the carriage 8, the cart 2 may be moved about on the wheels 18, 20, 22. In the second position, the cart 2 is supported by the base 6 and is stationary.

Main wheels 18 are attached to the carriage 8. When the carriage 8 is in the first, or deployed, position, the main wheels 18 support the weight of the cart 2 and its load of stone slabs 4. The main wheels 18 share a common axis of rotation 24 and are mounted to rotate independently one from another. The axis of rotation 24 of the main wheels 18 is located generally under the center of mass of the combination of the cart 2 and its load of stone slabs 4. As a result, the main wheels 18 support most of the weight of the cart 2 and the load of stone slabs 4 when the carriage 8 is in the first, or deployed, position.

A plurality of end wheels 20, 22 are mounted on swivels 26 attached to the carriage 8. A plurality of rear end wheels 22 is mounted on a rear end 28 of the carriage 8 and prevents the carriage 8 from tipping in the rear direction. A plurality of front end wheels 20 is mounted on a front end 30 of carriage 8 and prevents the carriage 8 from tipping in the front direction.

The front and rear end wheels 20, 22 together define a plane 32. The main wheels 18 extend downwardly about ½ inch further than the plane 32 defined by the end wheels 20, 22. As a result, either the front end wheels 20 or the rear end wheels 22, but not both the front and rear end wheels, may be in contact with a flat floor at any one time (illustrated by FIG. 2). The wheel arrangement of the Invention allows the cart 2 to be rotated (FIG. 4) and to be readily maneuvered when the carriage 8 is in the first position.

The Invention is equipped with a hydraulic lifting mechanism (generally indicated by number 34) to move the carriage 8 between the first and second positions. The hydraulic mechanism 34 comprises a hydraulic cylinder 36 connecting the base 6 and carriage 8, a hydraulic pump 38, a valve 40 and a hydraulic line 42. The hydraulic pump 38 is activated by foot pressure on a lever 44. The pump 38 forces hydraulic fluid 46 under pressure past the valve 40 and through the hydraulic line 42 to the hydraulic cylinder 36. The pressure applied to the hydraulic cylinder 36 causes the cylinder 36 to extend, moving the carriage 8 from the second, or retracted, position to the first, or deployed position, allowing the cart 8 to be moved about on wheels 18, 20, 22.

To render the cart 8 stationary and unable to move, the operator opens the valve 40, allowing hydraulic fluid 46 to return to the pump 38 and moving the carriage 8 to the second, or retracted position. The lower surface 48 of the base 6 engages the floor, removing the weight of the cart 2 and the load of stone slabs 4 from the wheels 18, 20, 22 and placing that weight on the lower surface 48 of the base 6.

The carriage 8 is guided in its up and down movements by pin and sleeve members 50. The opposite ends of the cart are provided with locking hooks 52 so that the cart 2 can be anchored to the floor of a truck when transporting the cart 2 from the factory to the site where the finished products are installed.

The 'A' frame 10 has a first pocket 54 and a second pocket 56 for smaller pieces of marble and granite such as those that form base boards or splash backs for a finished installation.

The cart 2 may be selectably equipped with supplemental frames 58 to support slabs 4 of stone that are too large to be accommodated by 'A' frame 10 and base 6 alone. The supplemental frame 58 is equipped with an angle bracket 60, horizontal brace 62 and clamping mechanism 64 for securing the supplemental frame 58 to the cart 2 and for securely supporting the weight of the oversize stone slab 4. FIG. 8A and FIG. 8B show the clamping mechanism 64 as a screw clamp; however, any suitable attachment means is contemplated, including without limitation spring clamps, lever clamps, strap clamps, pin connections, gravity connections, use of fasteners, hook and loop connectors, adhesives and generally any of the mechanisms for releasably attaching one mechanical device to another.

The second embodiment of the Invention is illustrated by FIGS. 11 through 15. The second embodiment is particularly suitable for moving single slabs 4 of stone in confined areas. A main wheel 18 is rotatably attached to a carriage 8 (FIG. 11). The carriage 8 is equipped with a carriage clamping mechanism 66 and is releasably clamped to one edge of a slab 4 of stone. The carriage 8 is mounted so that the main wheel 18 is located generally below the center of mass of the stone slab 4 so that the weight of the stone slab 4 rests upon the main wheel 18.

A plurality of front end wheels 20 (FIG. 11) is mounted on a front end wheel carriage 68. The front end wheel carriage 68 is releasably clamped to an edge of a front end 70 of the stone slab 4. Likewise, a plurality of rear end wheels 22 are mounted on a rear end wheel carriage 72. The rear end wheel carriage 72 is releasably clamped to an edge of a rear end 74 of the stone slab 4. The front and rear end wheels 20, 22 together define a line 75 (FIG. 15). The main wheel 18 extends downward approximately ½ inch beyond the line 75 such that either the plurality of front end wheels 20 or the plurality of rear end wheels 22, but not both, may touch a flat floor at one time. As in the first embodiment, the wheel arrangement allows the stone slab 4 to be rotated and maneuvered. The wheel arrangement also allows the stone slab 4 to be more easily moved over low obstacles.

While a single main wheel 18 is illustrated in the figures (FIGS. 12, 15) and may be used in the second embodiment, a plurality of main wheels 18 also may be used. Two front end wheels 20 and two rear end wheels 22 are illustrated in the figures (FIGS. 11, 15), but a single front 20 and a single rear end wheel 22 or a plurality of front 20 and rear end wheels 22 may be used.

Figure 14:
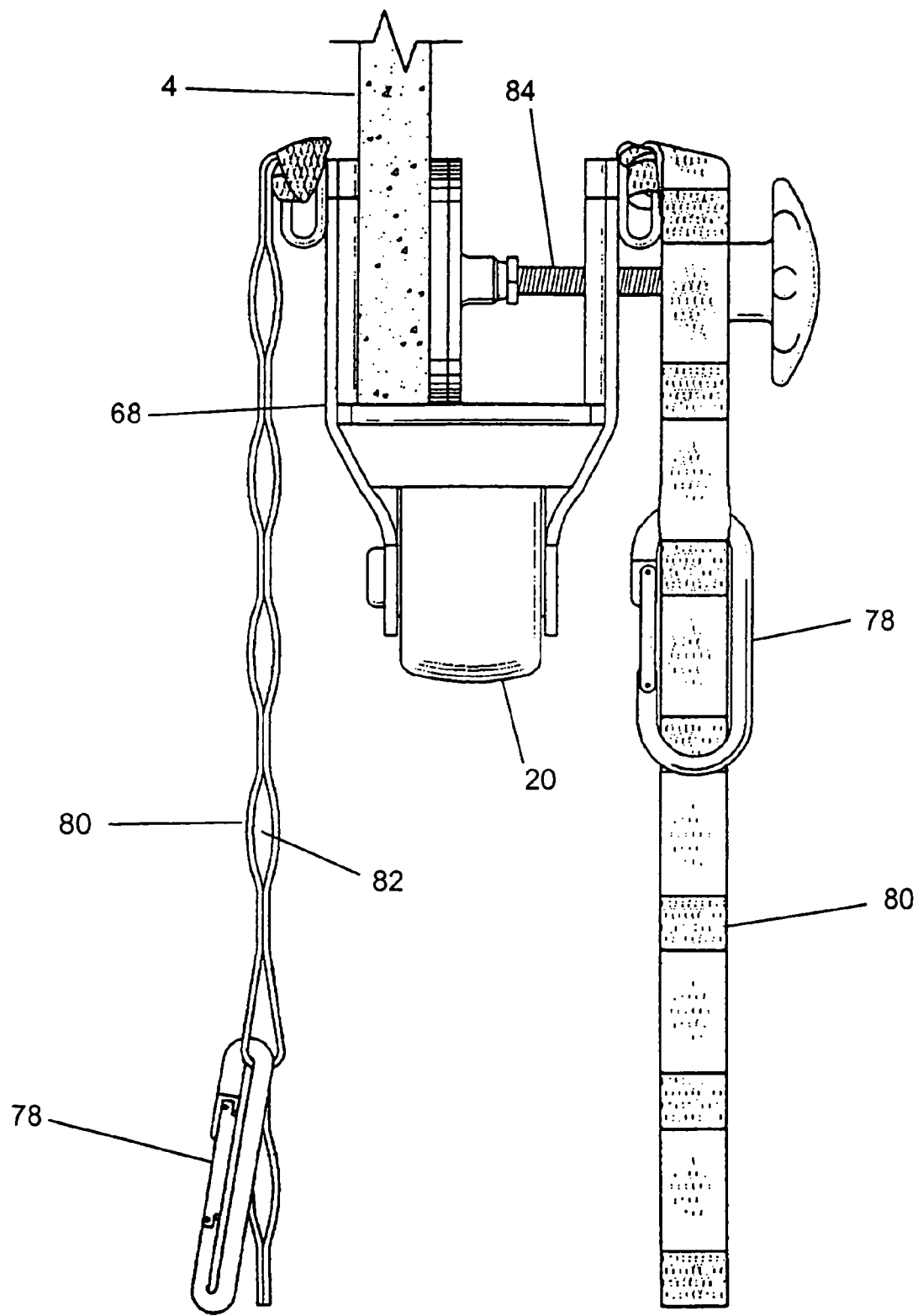
FIG. 14 is a detail of the strap attachment for the second embodiment.

To assist the operators in maneuvering the stone slab 4, adjustable straps 76 are connected to the front and rear end wheel carriages 68, 72 (FIGS. 11–14). A strap 76 may be adjusted by use of a carabiner 78 joining a lifting strap 80 to spaced openings 82 in adjustable strap 76. Any other adjustment mechanism providing positive, strong adjustment also may be used. The operators may pull on the lifting straps 80 to rotate the stone slab 4 on the main wheel 18 or to negotiate obstacles. FIG. 14 shows details of the screw clamp 84, front or rear end carriage (designated as front end carriage 68) and front or rear end wheel (designated as front end wheel 20) and connection between adjustable strap 76 and front end carriage 68.

The carriage 8, rear end wheel carriage 72 and front end wheel carriage 68 each may be releasably attached to the stone slab 4 by a plurality of screw clamps 84 or by any other suitable means, including without limitation spring clamps, lever clamps, strap clamps, cam clamps, pin connections, gravity connections, use of fasteners, hook and loop connectors, adhesives and generally any mechanisms for releasably attaching one object to another. The use of the term 'clamping means' in this application is defined to mean any and all manners of releasably attaching one object to another, including but not limited to the mechanisms stated in the preceding list.

Many different embodiments of the above invention are possible. This application is intended to address all possible embodiments and is limited only as described in the following claims.

I claim:

1. A cart for moving a plurality of large slabs of stone comprising:
   a. a carriage;
   b. means for supporting a plurality of stone slabs upon said carriage;
   c. a plurality of main wheels rotatably connected to said carriage, said plurality of main wheels having a common axis of rotation, said plurality of main wheels being located substantially below a combined center of mass of said plurality of slabs and said cart, each of said plurality of main wheels being rotatable independently from each of the other of said plurality of main wheels;
   d. a plurality of front end wheels adapted for rotation, said plurality of slabs having a front end, said plurality of front end wheels adapted to support said front end of said plurality of slabs;
   e. a plurality of rear end wheels adapted for rotation, the plurality of slabs having a rear end, said plurality of rear end wheels adapted to support the rear end of the plurality of slabs;
   f. said rear end wheels and said front end wheels being mounted to said carriage and adapted to swivel independently;
   g. said main wheels extending below said front end wheels and said rear end wheels such that said front end wheels and said rear end wheels may not both touch a flat floor at the same time, whereby a combined weight of the stone slabs and the cart is supported by said plurality of main wheels, and whereby said rear end wheels and said front end wheels prevent tipping of said cart and the stone slabs in a front direction and a rear direction;
   h. a base having a lower surface and movably connected to said carriage and operable between a first position wherein said main wheels engage the floor and support the combined weight of the stone slabs and cart and a second position wherein the lower surface of said base engages the floor and supports said weight wherein said main wheels and front end and rear end wheels are disengaged from the floor and do not support the weight;
   i. hydraulic means for moving said carriage and base between said first and second positions comprising a hydraulic piston and cylinder and means for conveying hydraulic fluid under pressure including a valve for controlling fluid flow and a pump with foot actuation means for selectively supplying fluid under pressure to operate said piston and cylinder; and
   j. an upstanding 'A' frame on said base having a plurality of pockets for supporting stone pieces and a plurality of strap clamps for restraining the stone slabs.

2. The cart of claim 1, further comprising a plurality of pin and sleeve connectors operably connected to said base and said carriage and restraining horizontal movement between said carriage and said base.

3. The cart of claim 2, further comprising a plurality of locking hooks affixed to said base and adapted to secure said cart for transport in a vehicle.

4. The cart of claim 3 further comprising:
   a. a plurality of supplemental frames adapted for attaching said plurality of slabs to said cart when said plurality of slabs are too large to be accommodated by said 'A' frame; and
   b. means for releasably attaching said plurality of supplemental frames to said cart.

* * * * *